United States Patent
Nirula et al.

(10) Patent No.: US 12,492,916 B2
(45) Date of Patent: Dec. 9, 2025

(54) POSITIONING OPERATION BASED ON FILTERED MAP DATA

(71) Applicant: QUALCOMM Incorporated, San Diego, CA (US)

(72) Inventors: Gautam Nirula, Pleasanton, CA (US); Himanshu Shah, Milpitas, CA (US); William Morrison, San Francisco, CA (US); Hsiao Chien Liang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 18/330,424

(22) Filed: Jun. 7, 2023

(65) Prior Publication Data

US 2024/0053170 A1    Feb. 15, 2024

Related U.S. Application Data

(60) Provisional application No. 63/371,460, filed on Aug. 15, 2022.

(51) Int. Cl.
*G01C 21/34* (2006.01)
*G01C 21/00* (2006.01)

(52) U.S. Cl.
CPC ..... *G01C 21/3874* (2020.08); *G01C 21/3461* (2013.01)

(58) Field of Classification Search
None
See application file for complete search history.

(56) References Cited

U.S. PATENT DOCUMENTS

| | | | |
|---|---|---|---|
| 6,266,615 B1 * | 7/2001 | Jin | G08G 1/096883 701/488 |
| 6,807,483 B1 * | 10/2004 | Chao | G01C 21/3492 340/995.23 |
| 10,563,993 B1 * | 2/2020 | Ho | G01C 21/3492 |
| 11,548,517 B2 * | 1/2023 | Golsch | H04W 76/10 |
| 2012/0290198 A1 * | 11/2012 | Firl | G08G 1/0133 701/117 |
| 2016/0069690 A1 | 3/2016 | Li et al. | |
| 2018/0167927 A1 * | 6/2018 | Beattie, Jr. | H04W 72/51 |
| 2020/0309529 A1 | 10/2020 | Lambert et al. | |
| 2020/0408536 A1 * | 12/2020 | Fasola | G01S 7/4808 |

(Continued)

OTHER PUBLICATIONS

International Search Report and Written Opinion—PCT/US2023/069212—ISA/EPO—Oct. 25, 2023.

(Continued)

*Primary Examiner* — Hunter B Lonsberry
*Assistant Examiner* — Robert L Pinkerton
(74) *Attorney, Agent, or Firm* — QUALCOMM Incorporated

(57) ABSTRACT

In a wireless system, a user device or a server obtains a global navigation satellite system (GNSS) position of the user device, a sensor-based trajectory of the user device, or both. The user device or the server filters map data indicating possible routes of the user device based on one or more criteria associated with the GNSS position, the sensor-based trajectory, or both to obtain filtered map data. The user device or the server determines a position estimate for the user device based on the filtered map data.

30 Claims, 11 Drawing Sheets

(56) References Cited

U.S. PATENT DOCUMENTS

2021/0064057 A1\* 3/2021 Eldar .................... G08G 1/167
2022/0076037 A1\* 3/2022 Hochman .............. G05D 1/249

OTHER PUBLICATIONS

Yang S., et al., "Road Constrained Monocular Visual Localization Using Gaussian-Gaussian Cloud Model", IEEE Transactions on Intelligent Transportation Systems, IEEE, Piscataway, NJ, USA, vol. 18, No. 12, Dec. 1, 2017, pp. 3449-3456, XP011674267, the Whole Document.

\* cited by examiner

POSITIONING OPERATION BASED ON FILTERED MAP DATA

CROSS-REFERENCE TO RELATED APPLICATIONS

The present Application for Patent claims the benefit of U.S. Provisional Application No. 63/371,460, entitled "POSITIONING OPERATION BASED ON FILTERED MAP DATA," filed Aug. 15, 2022, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc. Modern motor vehicles are therefore increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of positioning for a user device includes obtaining a global navigation satellite system (GNSS) position of the user device, a sensor-based trajectory of the user device, or both; filtering map data indicating possible routes of the user device based on one or more criteria associated with the GNSS position, the sensor-based trajectory, or both to obtain filtered map data; and determining a position estimate for the user device based on the filtered map data.

In an aspect, an apparatus includes a memory; and at least one processor communicatively coupled to the memory, the at least one processor configured to: obtain a global navigation satellite system (GNSS) position of a user device, a sensor-based trajectory of the user device, or both; filter map data indicating possible routes of the user device based on one or more criteria associated with the GNSS position, the sensor-based trajectory, or both to obtain filtered map data; and determine a position estimate for the user device based on the filtered map data.

In an aspect, an apparatus includes means for obtaining a global navigation satellite system (GNSS) position of a user device, a sensor-based trajectory of the user device, or both; means for filtering map data indicating possible routes of the user device based on one or more criteria associated with the GNSS position, the sensor-based trajectory, or both to obtain filtered map data; and means for determining a position estimate for the user device based on the filtered map data.

In an aspect, a non-transitory computer-readable medium stores computer-executable instructions that, when executed by an apparatus, cause the apparatus to: obtain a global navigation satellite system (GNSS) position of a user device, a sensor-based trajectory of the user device, or both; filter map data indicating possible routes of the user device based on one or more criteria associated with the GNSS position, the sensor-based trajectory, or both to obtain filtered map data; and determine a position estimate for the user device based on the filtered map data.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
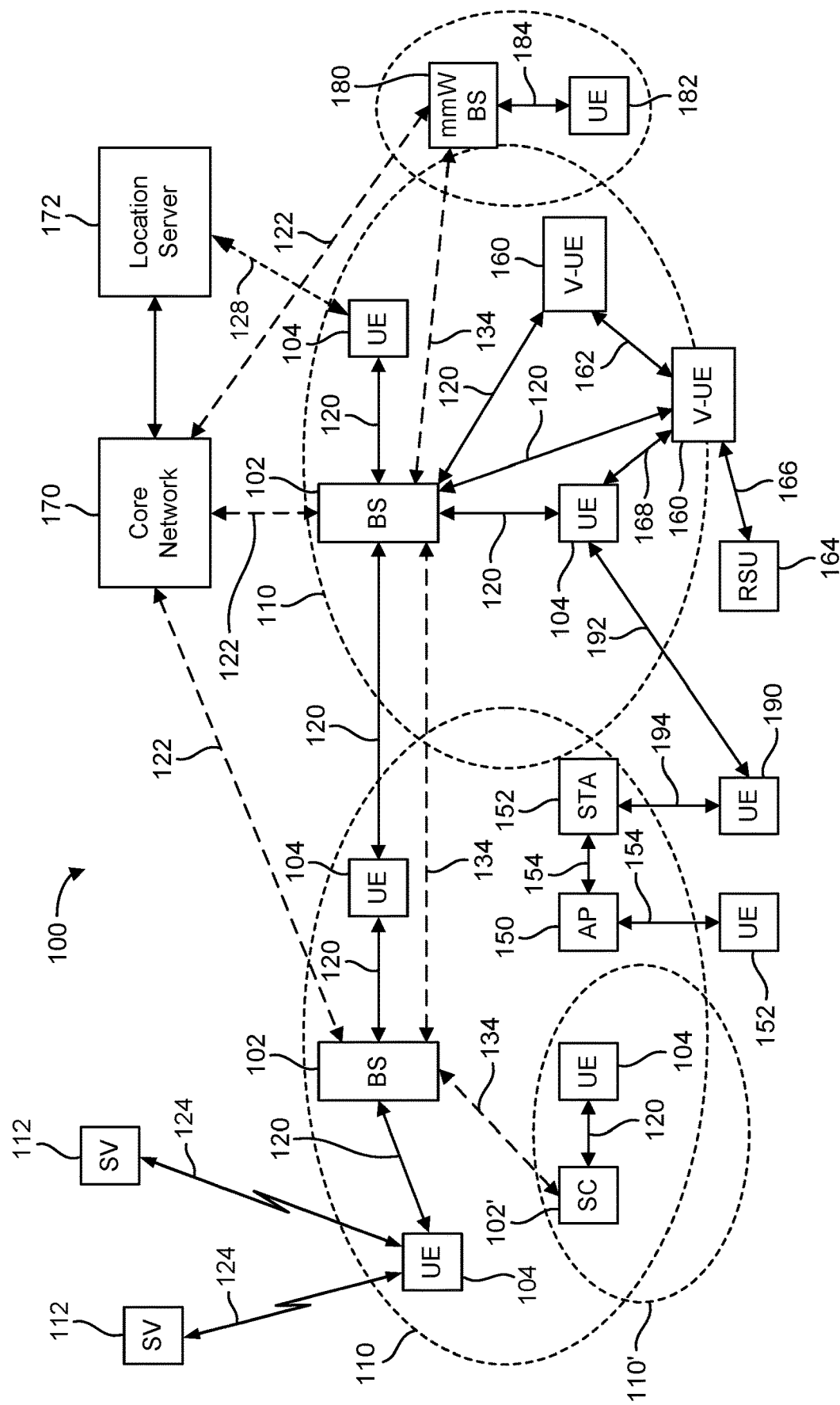
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof.

Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs.

In some systems a base station may provide purely edge node signaling functions while in other systems it may provide additional control and/or network management functions.

A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range.

Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
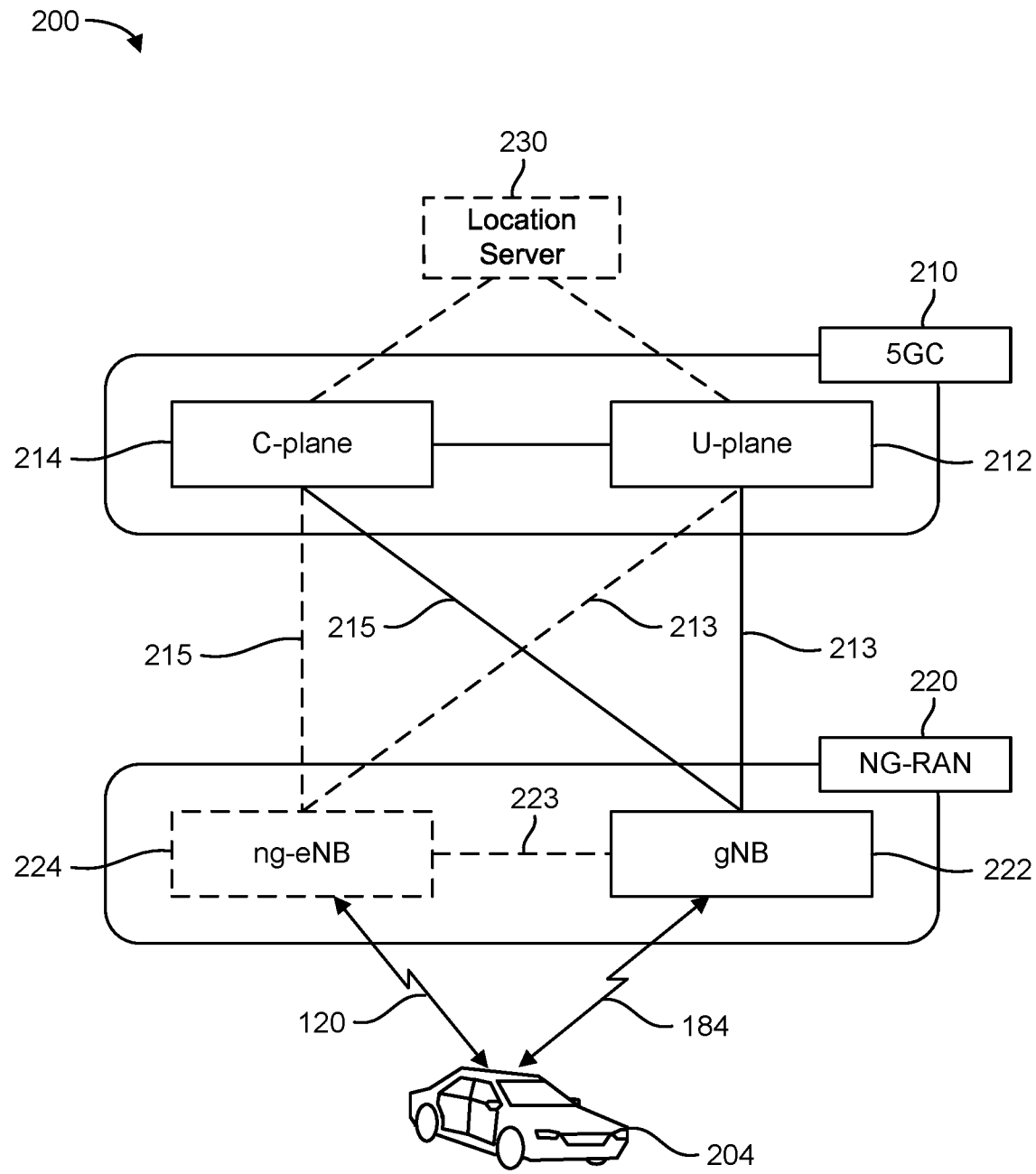
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein), which, in the example of FIG. 2A, is a V-UE.

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
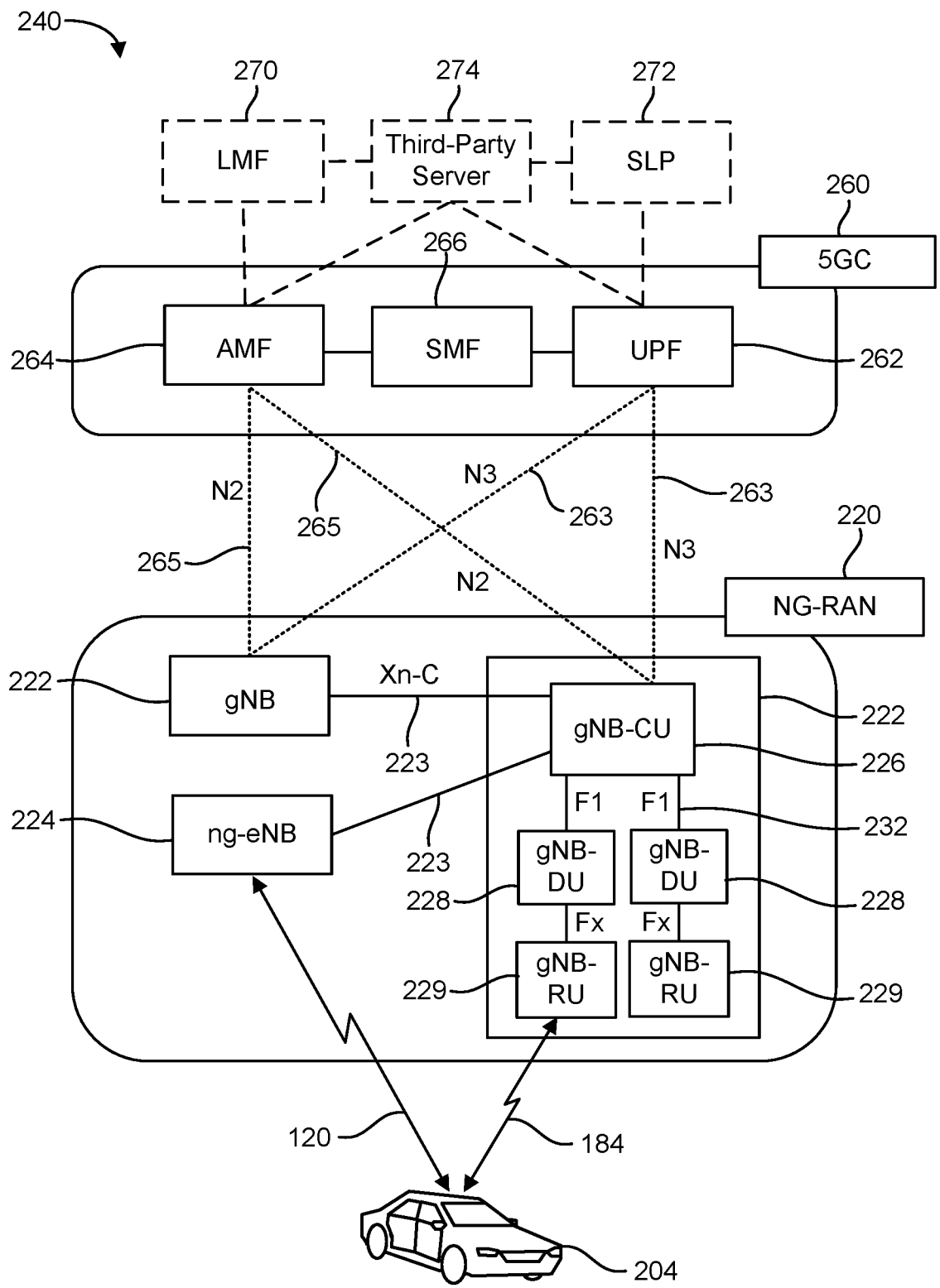

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., a V-UE) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Autonomous and semi-autonomous driving safety technologies use a combination of hardware (sensors, cameras, and radar) and software to help vehicles identify certain safety risks so they can warn the driver to act (in the case of an advanced driver assistance system (ADAS)), or act themselves (in the case of an automated driving systems (ADS)), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize RF waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Note that an autonomous or semi-autonomous vehicle may be, but need not be, a V-UE. Likewise, a V-UE may be, but need not be, an autonomous or semi-autonomous vehicle. An autonomous or semi-autonomous vehicle is a vehicle outfitted with an ADAS or ADS. A V-UE is a vehicle with cellular connectivity to a 5G or other cellular network. An autonomous or semi-autonomous vehicle that uses, or is capable of using, cellular techniques for positioning and/or navigation is a V-UE.

Figure 3:
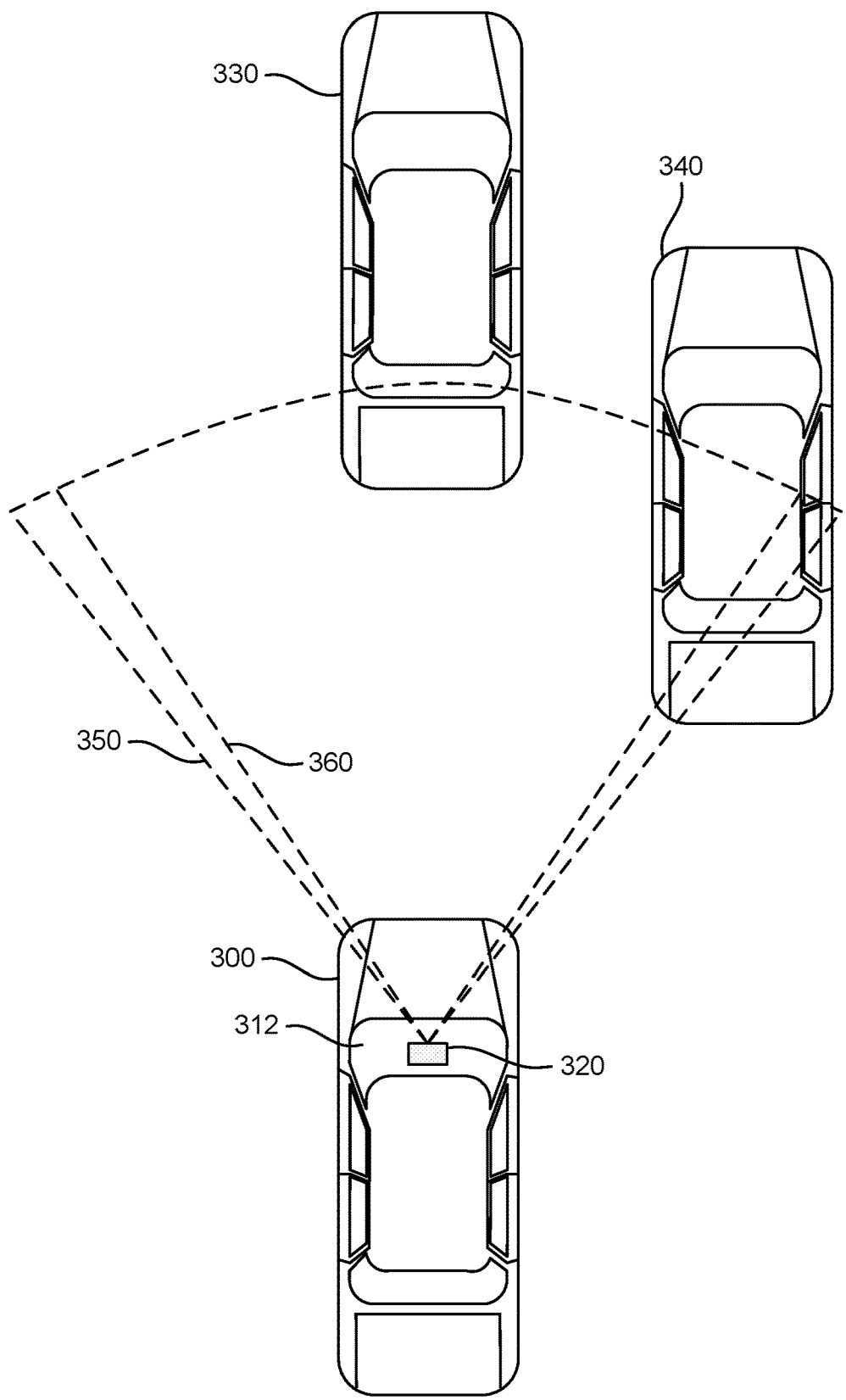
FIG. 3 is a top view of a vehicle employing an integrated radar-camera sensor behind the windshield, according to various aspects of the disclosure.

Referring now to FIG. 3, a vehicle 300 (referred to as an "ego vehicle" or a "host vehicle") is illustrated that includes a radar-camera sensor module 320 located in the interior compartment of the vehicle 300 behind the windshield 312. The radar-camera sensor module 320 includes a radar component configured to transmit radar signals through the windshield 312 in a horizontal coverage zone 350 (shown by dashed lines), and receive reflected radar signals that are reflected off of any objects within the coverage zone 350. The radar-camera sensor module 320 further includes a camera component for capturing images based on light waves that are seen and captured through the windshield 312 in a horizontal coverage zone 360 (shown by dashed lines).

Although FIG. 3 illustrates an example in which the radar component and the camera component are co-located components in a shared housing, as will be appreciated, they may be separately housed in different locations within the vehicle 300. For example, the camera may be located as shown in FIG. 3, and the radar component may be located in the grill or front bumper of the vehicle 300. Additionally, although FIG. 3 illustrates the radar-camera sensor module 320 located behind the windshield 312, it may instead be located in a rooftop sensor array, or elsewhere. Further, although FIG. 3 illustrates only a single radar-camera sensor module 320, as will be appreciated, the vehicle 300 may have multiple radar-camera sensor modules 320 pointed in different directions (to the sides, the front, the rear, etc.). The various radar-camera sensor modules 320 may be under the "skin" of the vehicle (e.g., behind the windshield 312, door panels, bumpers, grills, etc.) or within a rooftop sensor array.

The radar-camera sensor module 320 may detect one or more (or none) objects relative to the vehicle 300. In the example of FIG. 3, there are two objects, vehicles 330 and 340, within the horizontal coverage zones 350 and 360 that the radar-camera sensor module 320 can detect. The radar-camera sensor module 320 may estimate parameters (attributes) of the detected object(s), such as the position, range, direction, speed, size, classification (e.g., vehicle, pedestrian, road sign, etc.), and the like. The radar-camera sensor module 320 may be employed onboard the vehicle 300 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, collocation of the radar and camera is not required to practice the techniques described herein.

Figure 4:
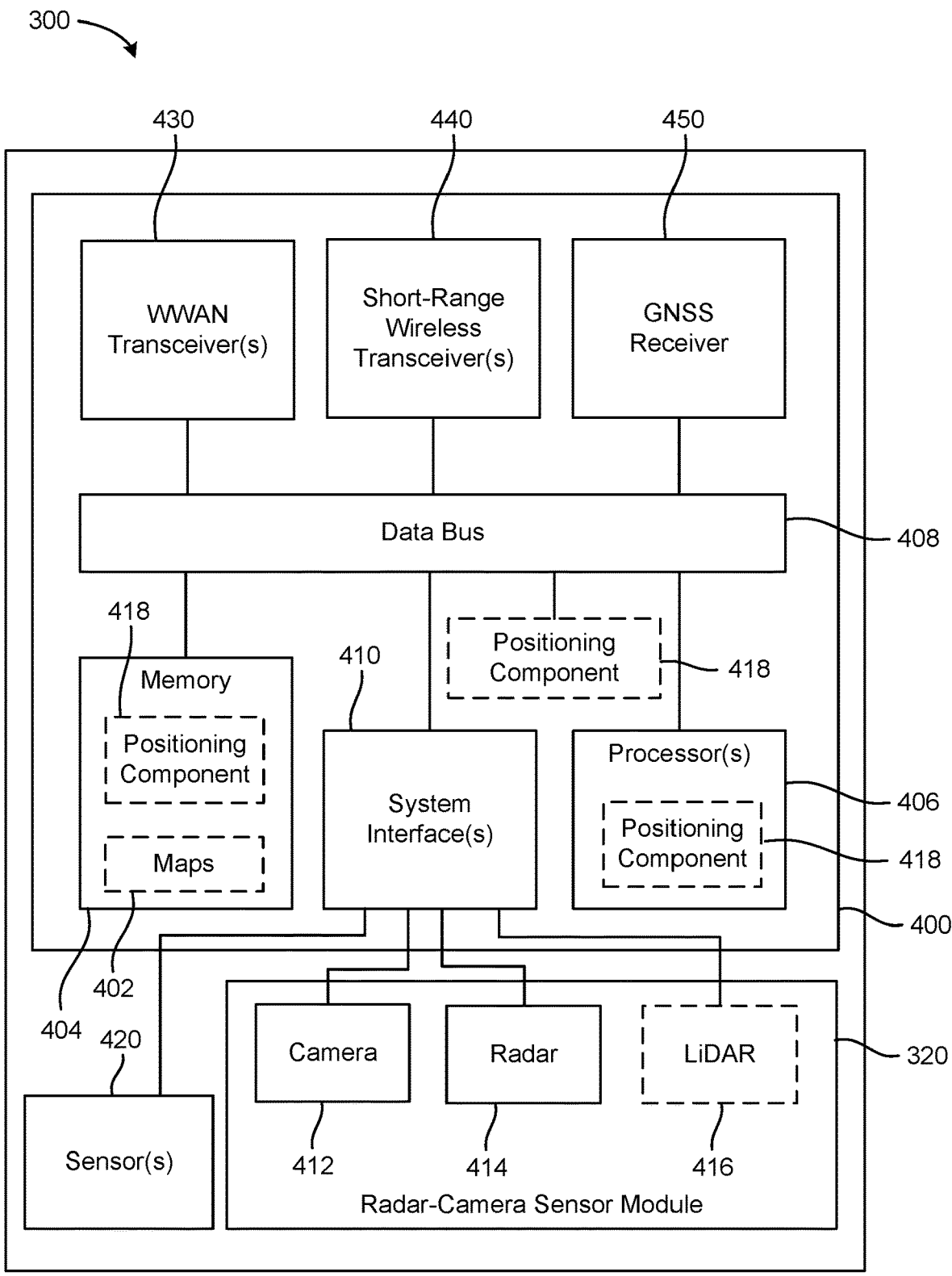
FIG. 4 illustrates an on-board computer architecture, according to various aspects of the disclosure.

FIG. 4 illustrates an on-board computer (OBC) 400 of a vehicle 300, according to various aspects of the disclosure. In an aspect, the OBC 400 may be part of an ADAS or ADS. The OBC 400 may also be the V-UE of the vehicle 300. The OBC 400 includes a non-transitory computer-readable storage medium, i.e., memory 404, and one or more processors 406 in communication with the memory 404 via a data bus 408. The memory 404 includes one or more storage modules storing computer-readable instructions executable by the one or more processors 406 to perform the functions of the OBC 400 described herein. For example, the one or more processors 406 in conjunction with the memory 404 may implement the various operations described herein.

One or more radar-camera sensor modules 320 are coupled to the OBC 400 (only one is shown in FIG. 4 for simplicity). In some aspects, the radar-camera sensor module 320 includes at least one camera 412, at least one radar 414, and an optional light detection and ranging (LiDAR) sensor 416. The OBC 400 also includes one or more system interfaces 410 connecting the one or more processors 406, by way of the data bus 408, to the radar-camera sensor module 320 and, optionally, other vehicle sub-systems (not shown).

The OBC 400 also includes, at least in some cases, one or more wireless wide area network (WWAN) transceivers 430 configured to communicate via one or more wireless communication networks (not shown), such as an NR network, an LTE network, a Global System for Mobile communication (GSM) network, and/or the like. The one or more WWAN transceivers 430 may be connected to one or more antennas (not shown) for communicating with other network nodes, such as other V-UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 430 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 400 also includes, at least in some cases, one or more short-range wireless transceivers 440 (e.g., a Wi-Fi transceiver, a Bluetooth transceiver, etc.). The one or more short-range wireless transceivers 440 may be connected to one or more antennas (not shown) for communicating with other network nodes, such as other V-UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The one or more short-range wireless transceivers 440 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 400 also includes, at least in some cases, a global navigation satellite system (GNSS) receiver 450. The GNSS receiver 450 may be connected to one or more antennas (not shown) for receiving satellite signals. The GNSS receiver 450 may comprise any suitable hardware and/or software for receiving and processing GNSS signals. The GNSS receiver 450 requests information and operations as appropriate from the other systems, and performs the calculations necessary to determine the vehicle's 300 position using measurements obtained by any suitable GNSS algorithm.

In an aspect, the OBC 400 may utilize the one or more WWAN transceivers 430 and/or the one or more short-range wireless transceivers 440 to download one or more maps 402 that can then be stored in memory 404 and used for vehicle navigation. Map(s) 402 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 300. Map(s) 402 may also provide electronic horizon predictive awareness, which enables the vehicle 300 to know what lies ahead.

The vehicle 300 may include one or more sensors 420 that may be coupled to the one or more processors 406 via the one or more system interfaces 410. The one or more sensors 420 may provide means for sensing or detecting information related to the state and/or environment of the vehicle 300, such as speed, heading (e.g., compass heading), headlight status, gas mileage, etc. By way of example, the one or more sensors 420 may include an odometer a speedometer, a tachometer, an accelerometer (e.g., a micro-electromechanical system-s (MEMS) device), a gyroscope, a geomagnetic sensor (e.g., a compass), an altimeter (e.g., a barometric pressure altimeter), etc. Although shown as located outside the OBC 400, some of these sensors 420 may be located on the OBC 400 and some may be located elsewhere in the vehicle 300.

The OBC 400 may further include a positioning component 418. The positioning component 418 may be a hardware circuit that is part of or coupled to the one or more processors 406 that, when executed, causes the OBC 400 to perform the functionality described herein. In other aspects, the positioning component 418 may be external to the one or more processors 406 (e.g., part of a positioning processing system, integrated with another processing system, etc.). Alternatively, the positioning component 418 may be one or more memory modules stored in the memory 404 that, when executed by the one or more processors 406 (or positioning processing system, another processing system, etc.), cause the OBC 400 to perform the functionality described herein. As a specific example, the positioning component 418 may comprise a plurality of positioning engines, a positioning engine aggregator, a sensor fusion module, and/or the like. FIG. 4 illustrates possible locations of the positioning component 418, which may be, for example, part of the memory 404, the one or more processors 406, or any combination thereof, or may be a standalone component.

In an aspect, the camera 412 may capture image frames (also referred to herein as camera frames) of the scene within the viewing area of the camera 412 (as illustrated in FIG. 3 as horizontal coverage zone 360) at some periodic rate. Likewise, the radar 414 may capture radar frames of the scene within the viewing area of the radar 414 (as illustrated in FIG. 3 as horizontal coverage zone 350) at some periodic rate. The periodic rates at which the camera 412 and the radar 414 capture their respective frames may be the same or different.

Each camera and radar frame may be timestamped. Thus, where the periodic rates are different, the timestamps can be used to select simultaneously, or nearly simultaneously, captured camera and radar frames for further processing (e.g., fusion).

Figure 5:
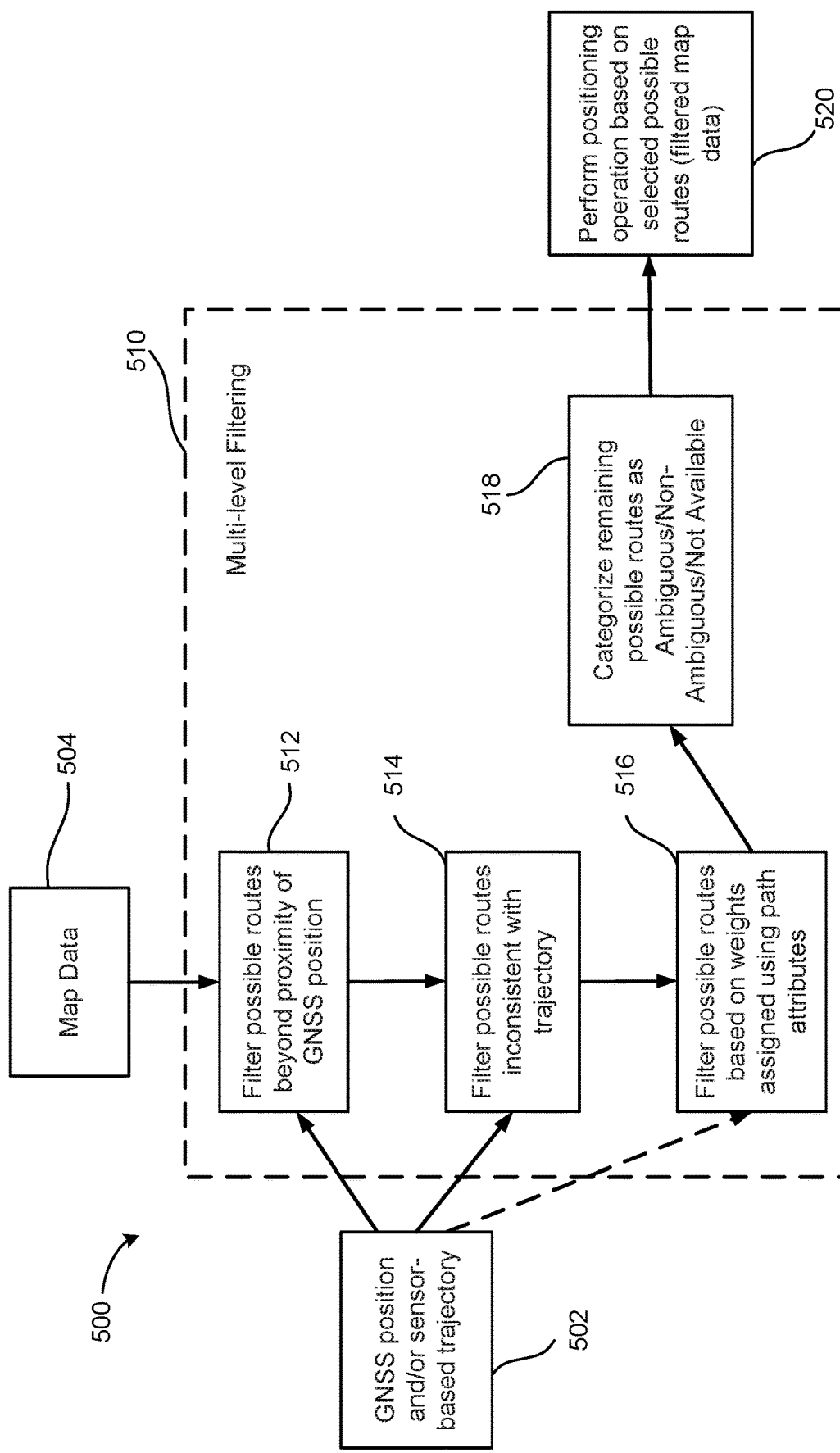
FIG. 5 illustrates a block diagram of a process flow of filtering map data and performing a positioning operation based on the filtered map data, according to various aspects of the disclosure.

FIG. 5 illustrates a block diagram of a process flow 500 of filtering map data and performing a positioning operation based on the filtered map data, according to various aspects of the disclosure. The data flow as shown in FIG. 5 may correspond to operations performed by a user device (such as any of the UEs (e.g., 104, 152, 182, 190, or 160) in FIG. 1, the UE 204 in FIGS. 2A and 2B, or the vehicle 300 in FIGS. 3 and 4, or the OBC 400 in FIG. 4), a server (such as any of the base stations in FIG. 1, the location server in FIGS. 1 and 2A, the LMF, SLP, or third-party sever in FIG. 2B), or both. The positioning operation is for determining a position estimate or a navigation solution for the user device.

As shown in FIG. 5, the process flow 500 includes a multi-level filtering process 510 that receives map data 502 and GNSS position and/or sensor-based trajectory of a user device 504, filters the map data 502 based on one or more criteria associated with the GNSS position and/or sensor-based trajectory of the user device 504, and provides the filtered map data, including, for example, selected possible routs of the user device, to a positioning process 520.

In one aspect, the map data may indicate possible routes of the user device. The possible routes may correspond to roads, pedestrian paths, ferry routes, etc. In one aspect, the map data may include pixel data representing the possible routes. In one aspect, the map data may include line segments representing the possible routes. In one aspect, the map data may include coordinates of the possible routes.

In some aspects, providing the map data directly to the positioning process 520 may improve the accuracy of the positioning process 520. However, in some cases, incorrect possible routes and/or too many possible routes available for the positioning process 520 may instead result in degraded performance of the positioning process 520.

Accordingly, in some aspects, instead of providing the map data 502 and the GNSS position and/or sensor-based trajectory 504 directly to the positioning process 520, the multi-level filtering process 510 may be used to select the possible routes that may be highly relevant to the positioning process 520 (i.e., filtered map data) based on one or more criteria associated with the GNSS position. In some aspects, the GNSS position and/or sensor-based trajectory 504 may be obtained and/or maintained independently from the map data and/or the result of the positioning process 520.

In some aspects, the multi-level filtering process 510 may include one or more stages of filtering processes based on the one or more criteria associated with the GNSS position, the sensor-based trajectory, or both.

For example, the one or more filtering processes may include process 512 that filters possible routes beyond certain proximity of the GNSS position, which may correspond to a criterion of a range threshold to filter possible routes that are outside a predetermined range of the GNSS position. In some aspects, the range threshold can be determined based on a type of the user device (e.g., a wearable device or a car-mounted OBC), or a mode of the navigation process (e.g., a pedestrian mode, a driving mode, or a public transportation mode), or a current moving speed of the user device, etc. For example, if the user device is a wearable device, the range threshold may differ based on whether the user carrying the user device is walking or traveling in a vehicle (as inferable based on the navigation mode and/or current moving speed).

The one or more filtering processes may include process 514 that filters possible routes inconsistent with the sensor-based trajectory, which may correspond to a criterion of an inconsistency threshold to filter possible routes that are inconsistent with the sensor-based trajectory. The inconsistency threshold may correspond to a heading of the trajectory, a curvature of the trajectory, an estimated speed of the user device based on the trajectory, or an estimated acceleration of the user device based on the trajectory, etc.

In some aspects, the one or more filtering processes may include process 516. In some aspects, process 516 includes assigning weights to the possible routes based on path attributes of the possible routes, and filtering the possible routes based on the corresponding weights satisfying a weightage threshold. In some aspects, the satisfying the weightage threshold corresponds to the corresponding weights being greater than the weightage threshold. In some aspects, the path attributes include a length, an area, or a type of the corresponding possible route. In some examples, process 516 may also be based on the GNSS position and/or the sensor-based trajectory. For example, the weights may be assigned based on whether the user carrying the user device is walking or traveling in a vehicle (as inferable based on, for example, the navigation mode and/or current moving speed, which can be determined based on the GNSS position and/or the sensor-based trajectory).

In some aspects, the multi-level filtering process 510 may include another process that filters the possible routes based on another criterion associated with the GNSS position or the sensor-based trajectory. In some aspects, process 512, process 514, and/or process 516 can be arranged in any order different from the example of FIG. 5 or may be omitted.

The multi-level filtering process 510 further includes process 518, where the remaining possible routes of the filtered map data can be categorized as non-ambiguous, ambiguous, or unavailable. For example, if a particular route of the remaining possible routes can be determined at process 518 to be selected by the positioning process 520 with sufficient certainty, the particular route of the remaining possible routes can be categorized as non-ambiguous. If two or more of the remaining possible routes can be determined by process 518 as selectable by the positioning process 520 with sufficient certainty, the two or more of the remaining possible routes can be categorized as ambiguous. Finally, the possible routes that can be determined by process 518 as unlikely to be selected by the positioning process 520 can be categorized as unavailable.

After process 518, the multi-level filtering process 510 can provide the selected possible routes to the positioning process 520, where the positioning operation is performed based on the filtered map data that include at least the possible routes selected at process 518. In one aspect, the selected possible routes include only the particular possible route that is categorized as non-ambiguous. In one aspect, the selected possible routes include plural possible routes that are categorized as ambiguous. In some aspects, all remining routes are provided to the positioning process 520 with corresponding categorization labels. In at least one aspect, the possible routes that are categorized as unavailable are not provided to the positioning process 520.

In the positioning process 520, the position estimate or the navigation solution for the user device can be determined based on the particular route that is categorized as non-ambiguous, with presence of the particular route categorized as non-ambiguous being provided by the multi-level filtering process 510. Moreover, the position estimate or the navigation solution for the user device can be determined based on one of plural routes that are categorized as ambiguous, with absence of the particular route categorized as non-ambiguous and presence of the plural routes categorized as ambiguous being provided by the multi-level filtering process 510.

Figure 6A:
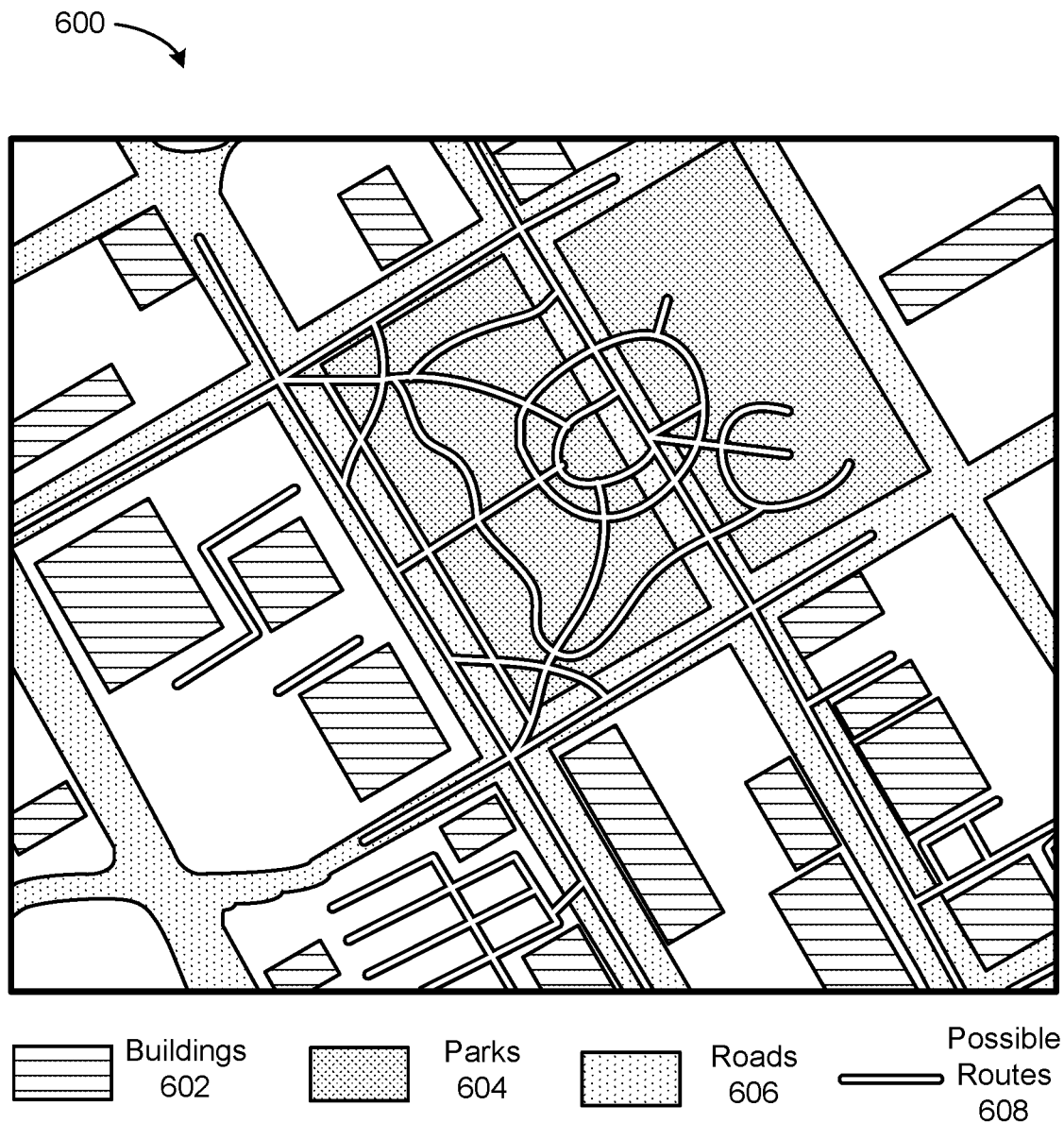
FIG. 6A illustrates a map represented by map data, according to various aspects of the disclosure.
Figure 6B:
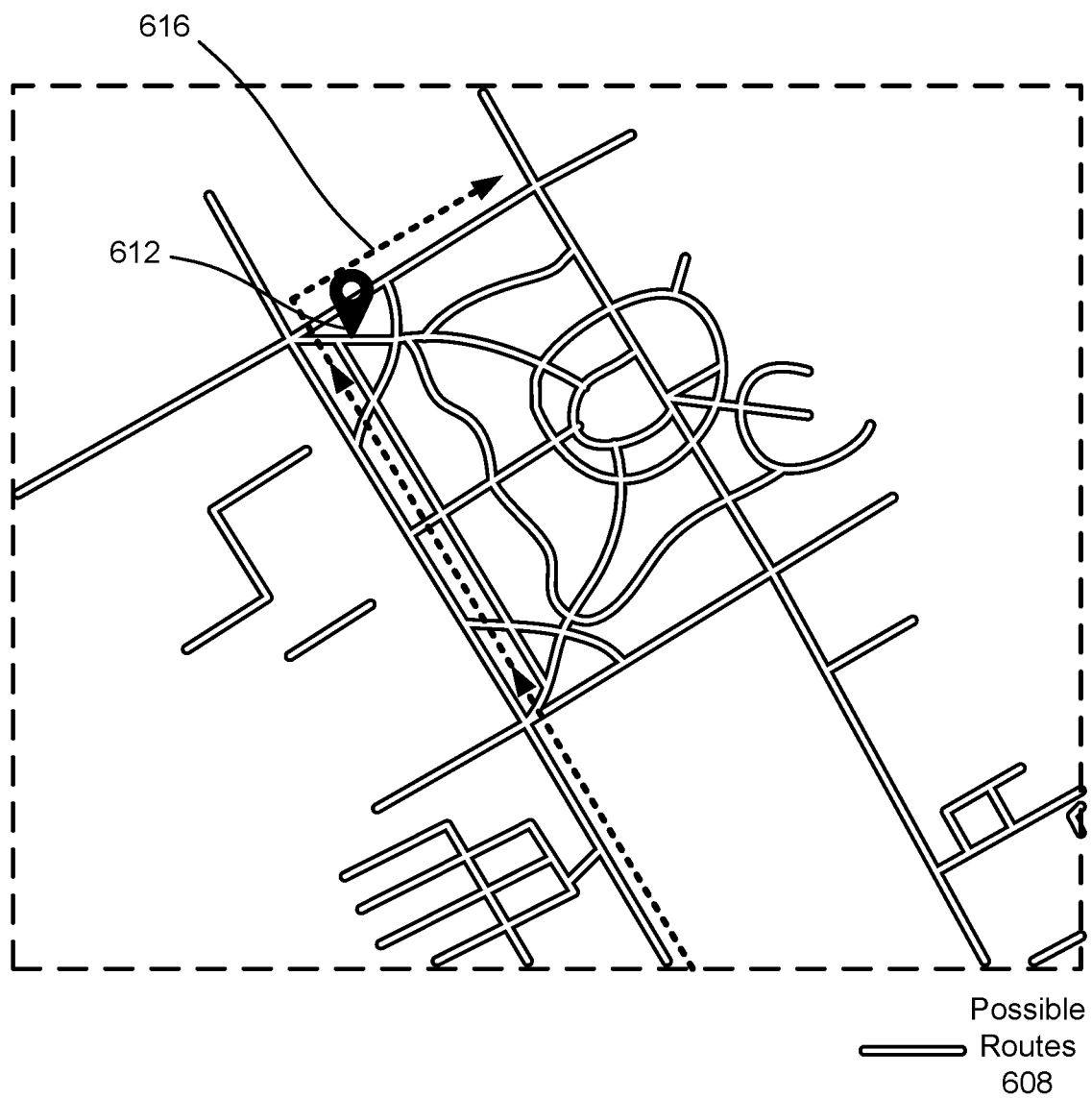
FIG. 6B illustrates possible routes of a user device indicated by the map data of FIG. 6A, overlaid with a global navigation satellite system (GNSS) position of the user device and a sensor-based trajectory of the user device, according to various aspects of the disclosure.

FIGS. 6A and 6B illustrate a non-limiting example of map data, GNSS position of a user device, and a sensor-based trajectory of the user device, on which the multi-level filtering process 510 may be based.

FIG. 6A illustrates a map 600 represented by map data, according to various aspects of the disclosure. As a non-limiting example, map 600 graphically illustrates real world features using different filling pattens, including the pattern for buildings 602, the pattern for parks 604, and the pattern for roads 606. In addition, the map data indicate possible routes for performing a positioning process for the user device. The possible routes are visualized in the map 600 as illustrated using pattern 608. In this non-limiting example, only pedestrian-usable routes are considered, and the possible routes, in one aspect, may correspond to at least the sidewalks along the roads, pedestrian paths between buildings, and trails in the parks.

FIG. 6B illustrates the possible routes of the user device indicated by the map data of FIG. 6A, overlaid with a GNSS position 612 of the user device and a sensor-based trajectory 616 of the user device, according to various aspects of the disclosure. The possible routes indicated by the map data are illustrated using pattern 608. In some aspects, each route of the possible routes are defined as a line segment (or a link) that ends either without adjoining any other route of the possible routes or ends by adjoining an end of another route of the possible routes.

In some aspects, the GNSS position 612 of the user device can be determined based on any of the positioning examples described above. In some aspects, the sensor-based trajectory 616 of the user device can be determined based on one or more motion sensors, acceleration sensors, radar sensors, or cameras of the user device, and/or based on radar sensors or cameras disposed outside the user device.

Figure 7A:
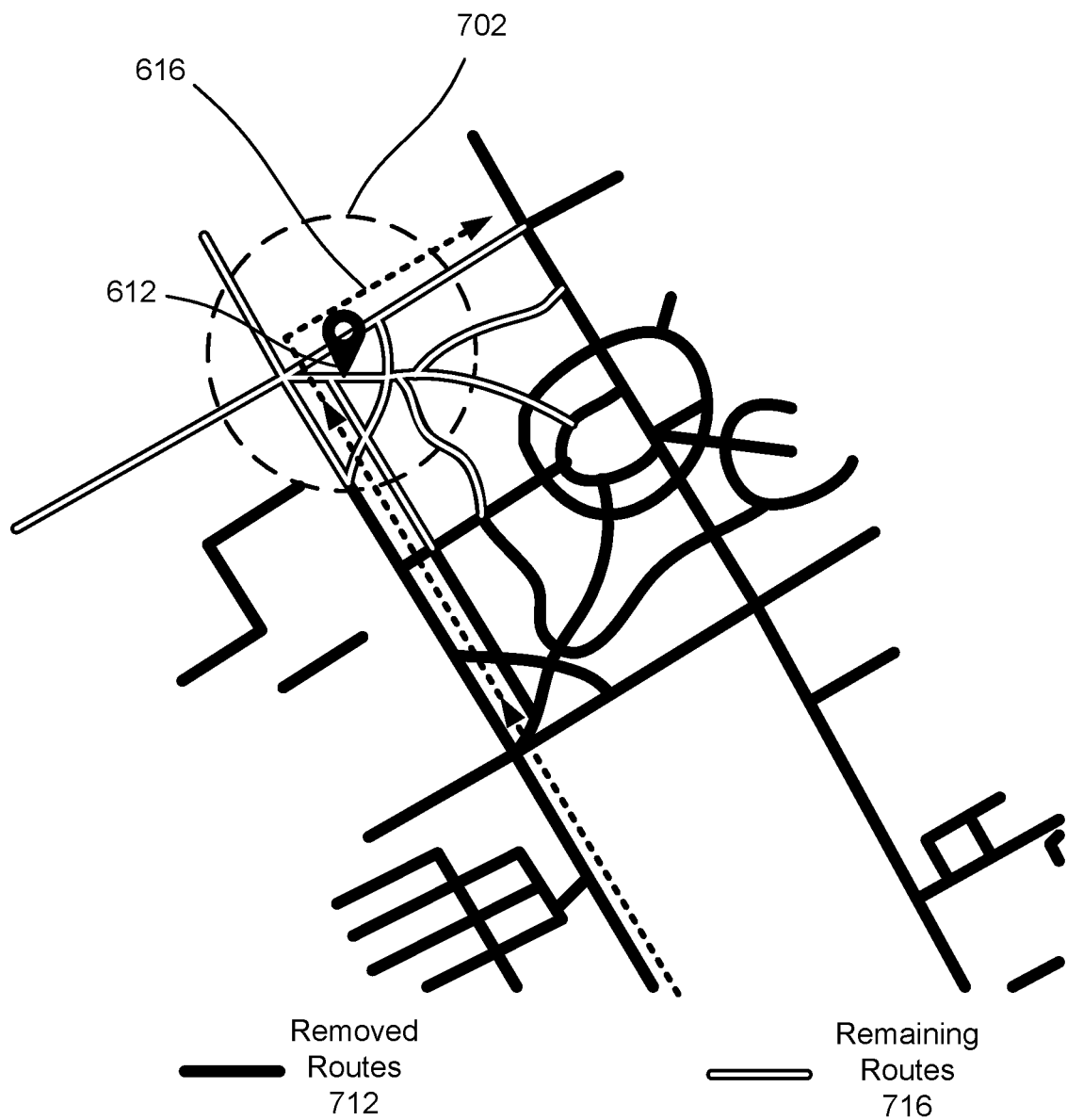
FIG. 7A illustrates filtering possible routes that are outside a predetermined range of the GNSS position of the user device, according to various aspects of the disclosure.

FIG. 7A illustrates filtering possible routes that are outside a predetermined range of the GNSS position of the user device, according to various aspects of the disclosure. The non-limiting example shown in FIG. 7A corresponds to performing process 512 in FIG. 5 based on the map data, GNSS position, and sensor-based trajectory as illustrated in FIGS. 6A and 6B.

According to the example of FIG. 7A, in some aspects, process 512 can be performed based on a criterion of a range threshold that defines an area 702 within a predetermined range of the GNSS position 612. In some aspects, the range threshold can be determined based on one or more of a type of the user device, a mode of the navigation process, a current moving speed of the user device, etc. In some aspects, process 512 filters the possible routes based on proximity with respect to the user device. Process 512 may filter possible routes that are outside the predetermined range of the GNSS position 612. In this example, the removed routes that are outside the area 702 are illustrated by pattern 712, and the remaining routes that are at least partially inside the area 702 are illustrated by pattern 716. In some aspects, process 512 may begin with possible routes that have already been filtered by one or more other filtering processes. In some aspects, process 512 may provide the remaining routes to another filtering process as possible routes with which to start.

Figure 7B:
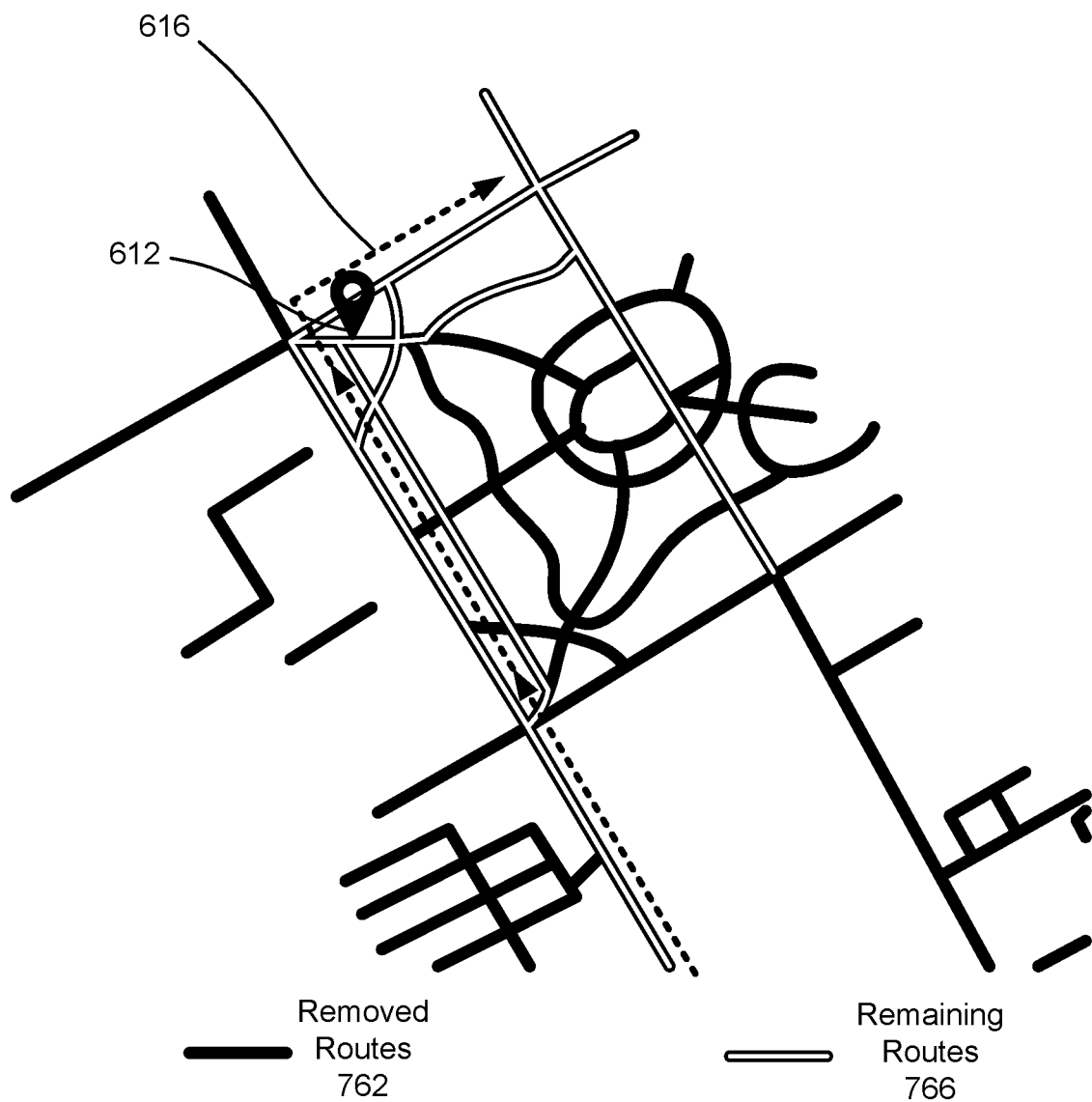
FIG. 7B illustrates filtering possible routes that are inconsistent with the sensor-based trajectory of the user device, according to various aspects of the disclosure.

FIG. 7B illustrates filtering possible routes that are inconsistent with the user trajectory of the user device, according to various aspects of the disclosure. The non-limiting example shown in FIG. 7B corresponds to performing process 514 in FIG. 5 based on the map data, GNSS position, and sensor-based trajectory as illustrated in FIGS. 6A and 6B.

According to the example of FIG. 7B, in some aspects, process 514 can be performed based on a criterion of an inconsistency threshold corresponding to one or more of a heading of the trajectory, a curvature of the trajectory, an estimated speed of the user device based on the trajectory, or an estimated acceleration of the user device based on the trajectory, etc. In this non-limiting example, the removed routes that are inconsistent with the trajectory 616 are illustrated by pattern 762, and the remaining routes that are not inconsistent with the trajectory 616 are illustrated by pattern 766. In some aspects, process 514 may begin with possible routes that have already been filtered by one or more other filtering processes. In some aspects, process 514 may provide the remaining routes to another filtering process as possible routes with which to start.

Figure 8:
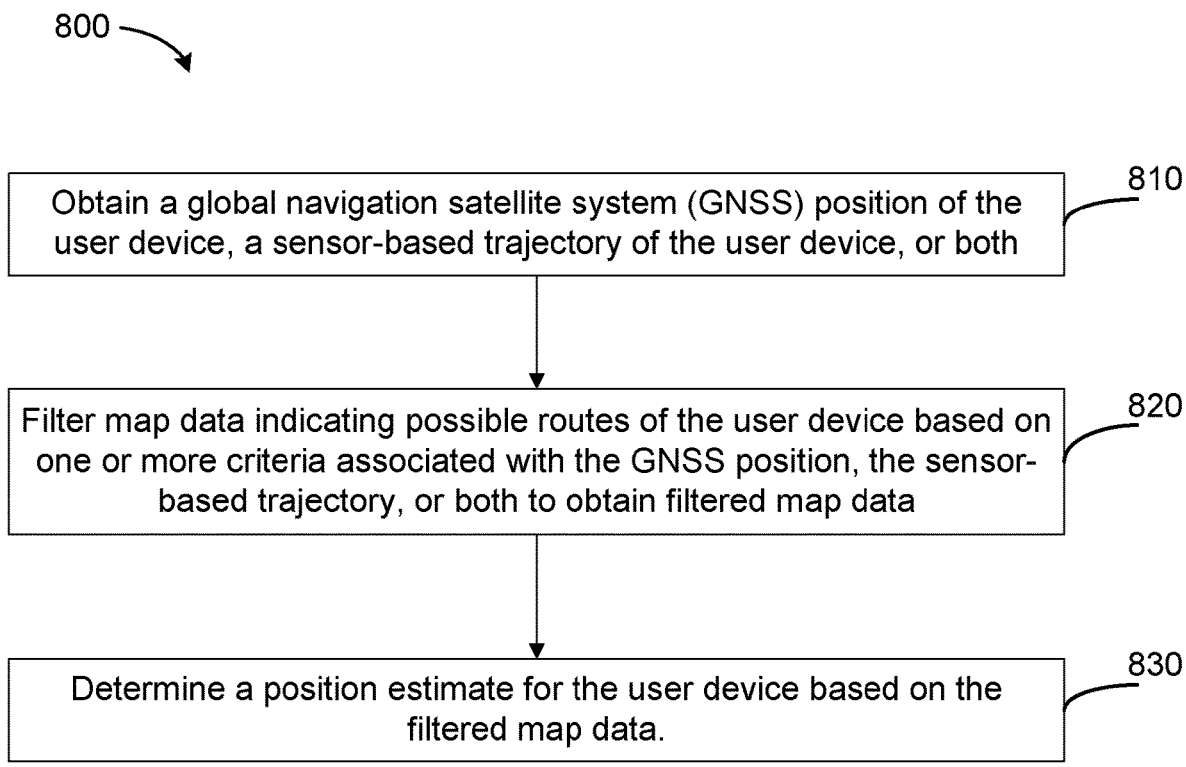
FIG. 8 illustrates an example method of positioning for a user device, according to aspects of the disclosure.

FIG. 8 illustrates an example method 800 of positioning for a user device, according to aspects of the disclosure. In an aspect, method 800 may be performed by a user device (such as the any of the UEs (e.g., 104, 152, 182, 190, or 160) in FIG. 1, the UE 204 in FIGS. 2A and 2B (e.g., 204), or the vehicle 300 in FIGS. 3 and 4, or the OBC 400 in FIG. 4), a server (such as any of the base stations in FIG. 1, the location server in FIGS. 1 and 2A, the LMF, SLP, or third-party sever in FIG. 2B), or both.

At 810, the user device or the server obtains a GNSS position of the user device, a sensor-based trajectory of the user device, or both. In an aspect, operation 810 may be performed by the one or more processors 406, memory 404, and/or positioning component 418, and may be performed in conjunction with the GNSS receiver 450, the one or more sensors 420, the radar-camera sensor module 320, the camera 412, the radar 414, and/or the LiDAR sensor 416, where any or all of which may be considered means for performing this operation. In an aspect, operation 810 may be performed by one or more processors of a server that is communicatively coupled with the user device.

At 820, the user device or the server filters map data indicating possible routes of the user device based on one or more criteria associated with the GNSS position, the sensor-based trajectory, or both to obtain filtered map data. In some aspects, operation 820 may include one or more of filtering process 512, or filtering process 514, or filtering process 516 as illustrated with reference to FIG. 5. In an aspect, operation 820 may be performed by the one or more processors 406, memory 404, and/or positioning component 418, and may be performed in conjunction with the GNSS receiver 450, the one or more sensors 420, the radar-camera sensor module 320, the camera 412, the radar 414, and/or the LiDAR sensor 416, where any or all of which may be considered means for performing this operation. In an aspect, operation 820 may be performed by one or more processors of a server that is communicatively coupled with the user device.

At 830, the user device or the server determines a position estimate or a navigation solution for the user device based on the filtered map data. In an aspect, operation 830 may be performed by the one or more processors 406, memory 404, and/or positioning component 418, and may be performed in conjunction with the GNSS receiver 450, the one or more sensors 420, the radar-camera sensor module 320, the camera 412, the radar 414, and/or the LiDAR sensor 416, where any or all of which may be considered means for performing this operation. In an aspect, operation 830 may be performed by one or more processors of a server that is communicatively coupled with the user device.

As will be appreciated, a technical advantage of the method 800 is improved accuracy and efficiency of the positioning operation for the user device, achieved by providing filtered map data including the selected possible routes that may be highly relevant to the positioning operation based on one or more criteria associated with the GNSS position and/or sensor-based trajectory.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of positioning for a user device, comprising: obtaining a global navigation satellite system (GNSS) position of the user device, a sensor-based trajectory of the user device, or both; filtering map data indicating possible routes of the user device based on one or more criteria associated with the GNSS position, the sensor-based trajectory, or both to obtain filtered map data; and determining a position estimate for the user device based on the filtered map data.

Clause 2. The method of clause 1, wherein the one or more criteria comprise: an inconsistency threshold to filter possible routes that are inconsistent with the sensor-based trajectory.

Clause 3. The method of clause 1, wherein the one or more criteria comprise: a range threshold to filter possible routes that are outside a predetermined range of the GNSS position.

Clause 4. The method of clause 1, wherein weights are assigned to the possible routes based on path attributes thereof, the path attributes including a length, an area, or a type of the corresponding route, and wherein the filtering the map data further comprises filtering possible routes based on the corresponding weights satisfying a weightage threshold.

Clause 5. The method of any of clauses 1 to 4, wherein the determining the position estimate for the user device based on the filtered map data comprises: categorizing remaining possible routes of the filtered map data as non-ambiguous, ambiguous, or unavailable; and determining the position estimate for the user device based on a particular route that is categorized as non-ambiguous, with presence of the particular route categorized as non-ambiguous.

Clause 6. The method of clause 5, wherein the determining the position estimate for the user device based on the filtered map data comprises: determining the position estimate for the user device based on one of plural routes that are categorized as ambiguous, with absence of the particular route categorized as non-ambiguous and presence of the plural routes categorized as ambiguous.

Clause 7. The method of any of clauses 1 to 6, wherein the map data include pixel data representing the possible routes.

Clause 8. The method of any of clauses 1 to 6, wherein the map data include line segments representing the possible routes.

Clause 9. The method of any of clauses 1 to 6, wherein the map data include coordinates of the possible routes.

Clause 10. An apparatus, comprising: a memory; and at least one processor communicatively coupled to the memory, the at least one processor configured to: obtain a global navigation satellite system (GNSS) position of a user device, a sensor-based trajectory of the user device, or both; filter map data indicating possible routes of the user device based on one or more criteria associated with the GNSS position, the sensor-based trajectory, or both to obtain filtered map data; and determine a position estimate for the user device based on the filtered map data.

Clause 11. The apparatus of clause 10, wherein the one or more criteria comprise: an inconsistency threshold to filter possible routes that are inconsistent with the sensor-based trajectory.

Clause 12. The apparatus of clause 10, wherein the one or more criteria comprise: a range threshold to filter possible routes that are outside a predetermined range of the GNSS position.

Clause 13. The apparatus of clause 10, wherein weights are assigned to the possible routes based on path attributes thereof, the path attributes including a length, an area, or a type of the corresponding route, and wherein the at least one processor configured to filter the map data comprises the at least one processor configured to filter possible routes based on the corresponding weights satisfying a weightage threshold.

Clause 14. The apparatus of any of clauses 10 to 13, wherein the at least one processor configured to determine the position estimate for the user device based on the filtered map data comprises the at least one processor configured to: categorize remaining possible routes of the filtered map data as non-ambiguous, ambiguous, or unavailable; and determine the position estimate for the user device based on a particular route that is categorized as non-ambiguous, with presence of the particular route categorized as non-ambiguous.

Clause 15. The apparatus of clause 14, wherein the at least one processor configured to determine the position estimate for the user device based on the filtered map data comprises the at least one processor configured to: determine the position estimate for the user device based on one of plural routes that are categorized as ambiguous, with absence of the particular route categorized as non-ambiguous and presence of the plural routes categorized as ambiguous.

Clause 16. The apparatus of any of clauses 10 to 15, wherein the map data include pixel data representing the possible routes.

Clause 17. The apparatus of any of clauses 10 to 15, wherein the map data include line segments representing the possible routes.

Clause 18. The apparatus of any of clauses 10 to 15, wherein the map data include coordinates of the possible routes.

Clause 19. An apparatus, comprising: means for obtaining a global navigation satellite system (GNSS) position of a user device, a sensor-based trajectory of the user device, or both; means for filtering map data indicating possible routes of the user device based on one or more criteria associated with the GNSS position, the sensor-based trajectory, or both to obtain filtered map data; and means for determining a position estimate for the user device based on the filtered map data.

Clause 20. The apparatus of clause 19, wherein the one or more criteria comprise: an inconsistency threshold to filter possible routes that are inconsistent with the sensor-based trajectory.

Clause 21. The apparatus of clause 19, wherein the one or more criteria comprise: a range threshold to filter possible routes that are outside a predetermined range of the GNSS position.

Clause 22. The apparatus of clause 19, wherein weights are assigned to the possible routes based on path attributes thereof, the path attributes including a length, an area, or a type of the corresponding route, and wherein the means for filtering the map data further comprises means for filtering possible routes based on the corresponding weights satisfying a weightage threshold.

Clause 23. The apparatus of any of clauses 19 to 22, wherein the means for determining the position estimate for the user device based on the filtered map data comprises: means for categorizing remaining possible routes of the filtered map data as non-ambiguous, ambiguous, or unavailable; and means for determining the position estimate for the user device based on a particular route that is categorized as non-ambiguous, with presence of the particular route categorized as non-ambiguous.

Clause 24. The apparatus of clause 23, wherein the means for determining the position estimate for the user device based on the filtered map data comprises: means for determining the position estimate for the user device based on one of plural routes that are categorized as ambiguous, with absence of the particular route categorized as non-ambiguous and presence of the plural routes categorized as ambiguous.

Clause 25. The apparatus of any of clauses 19 to 24, wherein the map data include pixel data representing the possible routes.

Clause 26. The apparatus of any of clauses 19 to 24, wherein the map data include line segments representing the possible routes.

Clause 27. The apparatus of any of clauses 19 to 24, wherein the map data include coordinates of the possible routes.

Clause 28. A non-transitory computer-readable medium storing computer-executable instructions that, when executed by an apparatus, cause the apparatus to: obtain a global navigation satellite system (GNSS) position of a user device, a sensor-based trajectory of the user device, or both; filter map data indicating possible routes of the user device based on one or more criteria associated with the GNSS position, the sensor-based trajectory, or both to obtain filtered map data; and determine a position estimate for the user device based on the filtered map data.

Clause 29. The non-transitory computer-readable medium of clause 28, wherein the one or more criteria comprise: an inconsistency threshold to filter possible routes that are inconsistent with the sensor-based trajectory.

Clause 30. The non-transitory computer-readable medium of clause 28, wherein the one or more criteria comprise: a range threshold to filter possible routes that are outside a predetermined range of the GNSS position.

Clause 31. The non-transitory computer-readable medium of clause 28, wherein weights are assigned to the possible routes based on path attributes thereof, the path attributes including a length, an area, or a type of the corresponding route, and wherein the instructions that, when executed by the apparatus, cause the apparatus to filter the map data comprises instructions that, when executed by the apparatus, cause the apparatus to filter possible routes based on the corresponding weights satisfying a weightage threshold.

Clause 32. The non-transitory computer-readable medium of any of clauses 28 to 31, wherein the instructions that, when executed by the apparatus, cause the apparatus to determine the position estimate for the user device based on the filtered map data comprises instructions that, when executed by the apparatus, cause the apparatus to: categorize remaining possible routes of the filtered map data as non-ambiguous, ambiguous, or unavailable; and determine the position estimate for the user device based on a particular route that is categorized as non-ambiguous, with presence of the particular route categorized as non-ambiguous.

Clause 33. The non-transitory computer-readable medium of clause 32, wherein the instructions that, when executed by the apparatus, cause the apparatus to determine the position estimate for the user device based on the filtered map data comprises instructions that, when executed by the apparatus, cause the apparatus to: determine the position estimate for the user device based on one of plural routes that are categorized as ambiguous, with absence of the particular route categorized as non-ambiguous and presence of the plural routes categorized as ambiguous.

Clause 34. The non-transitory computer-readable medium of any of clauses 28 to 33, wherein the map data include pixel data representing the possible routes.

Clause 35. The non-transitory computer-readable medium of any of clauses 28 to 33, wherein the map data include line segments representing the possible routes.

Clause 36. The non-transitory computer-readable medium of any of clauses 28 to 33, wherein the map data include coordinates of the possible routes.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of positioning for a user device, comprising:
obtaining a global navigation satellite system (GNSS) position of the user device, a sensor-based trajectory of the user device, or both;
filtering map data indicating possible routes of the user device based on a range threshold to remove a first set of one or more routes from the possible routes outside a predetermined range of the GNSS position and an inconsistency threshold to remove a second set of one or more routes from the possible routes that are inconsistent with the sensor-based trajectory to obtain filtered map data, wherein the inconsistency threshold is based at least in part on one or more motion parameters of the user device;
determining a position estimate for the user device based on the filtered map data; and
performing one or more actions based on the position estimate.

2. The method of claim 1, wherein the one or more motion parameters comprise:
a heading of the sensor-based trajectory;
a curvature of the sensor-based trajectory;
an estimated speed of the user device based on the sensor-based trajectory; or
an estimated acceleration of the user device based on the sensor based trajectory.

3. The method of claim 1, wherein the range threshold is based at least in part on:
a type of the user device;
a mode of navigation; or
a speed of the user device.

4. The method of claim 1,
wherein weights are assigned to the possible routes based on path attributes thereof, the path attributes including a length, an area, or a type of the corresponding route, and
wherein the filtering the map data further comprises filtering possible routes based on the corresponding weights satisfying a weightage threshold.

5. The method of claim 1, wherein the map data include pixel data representing the possible routes.

6. The method of claim 1, wherein the map data include line segments representing the possible routes.

7. The method of claim 1, wherein the map data include coordinates of the possible routes.

8. The method of claim 1, wherein the determining the position estimate for the user device based on the filtered map data comprises:
categorizing remaining possible routes of the filtered map data as non-ambiguous, ambiguous, or unavailable; and
determining the position estimate for the user device based on a particular route that is categorized as non-ambiguous, with presence of the particular route categorized as non-ambiguous.

9. The method of claim 8, wherein the determining the position estimate for the user device based on the filtered map data comprises:
determining the position estimate for the user device based on one of plural routes that are categorized as ambiguous, with absence of the particular route categorized as non-ambiguous and presence of the plural routes categorized as ambiguous.

10. An apparatus, comprising:
a memory; and
one or more processors communicatively coupled to the memory, the one or more processors, either alone or in combination, configured to:
obtain a global navigation satellite system (GNSS) position of a user device, a sensor-based trajectory of the user device, or both;
filter map data indicating possible routes of the user device based on a range threshold to remove a first set of one or more routes from the possible routes outside a predetermined range of the GNSS position and an inconsistency threshold to remove a second set of one or more routes from the possible routes that are inconsistent with the sensor-based trajectory to obtain filtered map data, wherein the inconsistency threshold is based at least in part on one or more motion parameters of the user device;
determine a position estimate for the user device based on the filtered map data; and
perform one or more actions based on the position estimate.

11. The apparatus of claim 10, wherein the one or more motion parameters comprise:
a heading of the sensor-based trajectory;
a curvature of the sensor-based trajectory;
an estimated speed of the user device based on the sensor-based trajectory; or
an estimated acceleration of the user device based on the sensor based trajectory.

12. The apparatus of claim 10, wherein the range threshold is based at least in part on:
a type of the user device;
a mode of navigation; or
a speed of the user device.

13. The apparatus of claim 10,
wherein weights are assigned to the possible routes based on path attributes thereof, the path attributes including a length, an area, or a type of the corresponding route, and
wherein the one or more processors, either alone or in combination, configured to filter the map data comprise the one or more processors, either alone or in combination, configured to filter possible routes based on the corresponding weights satisfying a weightage threshold.

14. The apparatus of claim 10, wherein the map data include pixel data representing the possible routes, line segments representing the possible routes, or coordinates of the possible routes, or a combination thereof.

15. The apparatus of claim 10, wherein the one or more processors, either alone or in combination, configured to determine the position estimate for the user device based on the filtered map data comprise the one or more processors, either alone or in combination, configured to:
categorize remaining possible routes of the filtered map data as non-ambiguous, ambiguous, or unavailable; and
determine the position estimate for the user device based on a particular route that is categorized as non-ambiguous, with presence of the particular route categorized as non-ambiguous.

16. The apparatus of claim 15, wherein the one or more processors, either alone or in combination, configured to determine the position estimate for the user device based on the filtered map data comprise the one or more processors, either alone or in combination, configured to:
   determine the position estimate for the user device based on one of plural routes that are categorized as ambiguous, with absence of the particular route categorized as non-ambiguous and presence of the plural routes categorized as ambiguous.

17. An apparatus, comprising:
   means for obtaining a global navigation satellite system (GNSS) position of a user device, a sensor-based trajectory of the user device, or both;
   means for filtering map data indicating possible routes of the user device based on a range threshold to remove a first set of one or more routes from the possible routes outside a predetermined range of the GNSS position and an inconsistency threshold to remove a second set of one or more routes from the possible routes that are inconsistent with the sensor-based trajectory to obtain filtered map data, wherein the inconsistency threshold is based at least in part on one or more motion parameters of the user device;
   means for determining a position estimate for the user device based on the filtered map data; and
   means for performing one or more actions based on the position estimate.

18. The apparatus of claim 17, wherein the one or more motion parameters comprise:
   a heading of the sensor-based trajectory;
   a curvature of the sensor-based trajectory;
   an estimated speed of the user device based on the sensor-based trajectory; or
   an estimated acceleration of the user device based on the sensor based trajectory.

19. The apparatus of claim 17, wherein the range threshold is based at least in part on:
   a type of the user device;
   a mode of navigation; or
   a speed of the user device.

20. The apparatus of claim 17,
   wherein weights are assigned to the possible routes based on path attributes thereof, the path attributes including a length, an area, or a type of the corresponding route, and
   wherein the means for filtering the map data further comprises means for filtering possible routes based on the corresponding weights satisfying a weightage threshold.

21. The apparatus of claim 17, wherein the map data include pixel data representing the possible routes, line segments representing the possible routes, or coordinates of the possible routes, or a combination thereof.

22. The apparatus of claim 17, wherein the means for determining the position estimate for the user device based on the filtered map data comprises:
   means for categorizing remaining possible routes of the filtered map data as non-ambiguous, ambiguous, or unavailable; and
   means for determining the position estimate for the user device based on a particular route that is categorized as non-ambiguous, with presence of the particular route categorized as non-ambiguous.

23. The apparatus of claim 22, wherein the means for determining the position estimate for the user device based on the filtered map data comprises:
   means for determining the position estimate for the user device based on one of plural routes that are categorized as ambiguous, with absence of the particular route categorized as non-ambiguous and presence of the plural routes categorized as ambiguous.

24. A non-transitory computer-readable medium storing computer-executable instructions that, when executed by an apparatus, cause the apparatus to:
   obtain a global navigation satellite system (GNSS) position of a user device, a sensor-based trajectory of the user device, or both;
   filter map data indicating possible routes of the user device based on a range threshold to remove a first set of one or more routes from the possible routes outside a predetermined range of the GNSS position and an inconsistency threshold to remove a second set of one or more routes from the possible routes that are inconsistent with the sensor-based trajectory to obtain filtered map data, wherein the inconsistency threshold is based at least in part on one or more motion parameters of the user device;
   determine a position estimate for the user device based on the filtered map data; and
   perform one or more actions based on the position estimate.

25. The non-transitory computer-readable medium of claim 24, wherein the one or more motion parameters comprise:
   a heading of the sensor-based trajectory;
   a curvature of the sensor-based trajectory;
   an estimated speed of the user device based on the sensor-based trajectory; or
   an estimated acceleration of the user device based on the sensor based trajectory.

26. The non-transitory computer-readable medium of claim 24, wherein the range threshold is based at least in part on:
   a type of the user device;
   a mode of navigation; or
   a speed of the user device.

27. The non-transitory computer-readable medium of claim 24,
   wherein weights are assigned to the possible routes based on path attributes thereof, the path attributes including a length, an area, or a type of the corresponding route, and
   wherein the instructions that, when executed by the apparatus, cause the apparatus to filter the map data comprises instructions that, when executed by the apparatus, cause the apparatus to filter possible routes based on the corresponding weights satisfying a weightage threshold.

28. The non-transitory computer-readable medium of claim 24, wherein the map data include pixel data representing the possible routes, line segments representing the possible routes, or coordinates of the possible routes, or a combination thereof.

29. The non-transitory computer-readable medium of claim 24, wherein the instructions that, when executed by the apparatus, cause the apparatus to determine the position estimate for the user device based on the filtered map data comprises instructions that, when executed by the apparatus, cause the apparatus to:
   categorize remaining possible routes of the filtered map data as non-ambiguous, ambiguous, or unavailable; and
   determine the position estimate for the user device based on a particular route that is categorized as non-ambiguous, with presence of the particular route categorized as non-ambiguous.

30. The non-transitory computer-readable medium of claim 29, wherein the instructions that, when executed by the apparatus, cause the apparatus to determine the position estimate for the user device based on the filtered map data comprises instructions that, when executed by the apparatus, cause the apparatus to:
  determine the position estimate for the user device based on one of plural routes that are categorized as ambiguous, with absence of the particular route categorized as non-ambiguous and presence of the plural routes categorized as ambiguous.

* * * * *